United States Patent
Zhang et al.

(10) Patent No.: US 12,328,184 B2
(45) Date of Patent: Jun. 10, 2025

(54) MULTI-SOURCE SIGNAL SYNCHRONIZATION SYSTEM AND METHOD

(71) Applicant: SHENZHEN NOVOCARE MEDICAL TECHNOLOGY CO., LTD, Guangdong (CN)

(72) Inventors: Jiabao Zhang, Guangdong (CN); Chengying Wei, Guangdong (CN); Zhijian Huang, Guangdong (CN); Huadong Li, Guangdong (CN); Guangping Dong, Guangdong (CN)

(73) Assignee: SHENZHEN NOVOCARE MEDICAL TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/220,012

(22) PCT Filed: Aug. 29, 2021

(86) PCT No.: PCT/CN2021/115188
§ 371 (c)(1),
(2) Date: Jul. 1, 2024

(87) PCT Pub. No.: WO2022/148025
PCT Pub. Date: Jul. 14, 2022

(65) Prior Publication Data
US 2025/0112718 A1  Apr. 3, 2025

(30) Foreign Application Priority Data
Jan. 11, 2021 (CN) .......................... 202110030703.9

(51) Int. Cl.
*H04J 3/06* (2006.01)
*H04W 56/00* (2009.01)

(52) U.S. Cl.
CPC .......... *H04J 3/0661* (2013.01); *H04J 3/0644* (2013.01); *H04W 56/001* (2013.01)

(58) Field of Classification Search
CPC .... H04J 3/0661; H04J 3/0644; H04W 56/001
See application file for complete search history.

(56) References Cited

U.S. PATENT DOCUMENTS

2015/0036776 A1* 2/2015 Sheet .................... H04J 3/0661
375/376

FOREIGN PATENT DOCUMENTS

| CN | 108255048 A | 7/2018 |
| CN | 110492965 A | 11/2019 |

(Continued)

OTHER PUBLICATIONS

International Search Report of PCT/CN2021/115188.
Written Opinion of PCT/CN2021/115188.

*Primary Examiner* — Kyaw Z Soe

(57) ABSTRACT

The present disclosure provides a multi-source signal synchronization system and method applied to a plurality of signal sources with different collection clock frequencies. The system includes: a timing beacon sending unit, configured to generate RTC timing beacons at a fixed time interval T, and send the RTC timing beacons to slave machine signal sources; a timing beacon receiving unit, configured to be enabled at a moment (T-t1) after receiving a previous RTC timing beacon so as to be in a state for waiting to receive a next RTC timing beacon, and disabled after receiving the next RTC timing beacon; a multi-signal collecting unit, configured to collect a plurality of collected signals; and, a signal synchronization processing unit, configured to align signal headers based on a same synchronization mark of the multiple signals.

11 Claims, 2 Drawing Sheets

(56) References Cited

FOREIGN PATENT DOCUMENTS

| CN | 112804022 A | 5/2021 |
|----|-------------|--------|
| WO | 2018098606 A1 | 6/2018 |

\* cited by examiner

MULTI-SOURCE SIGNAL SYNCHRONIZATION SYSTEM AND METHOD

CROSS-REFERENCE TO RELATED APPLICATIONS

This Application is a national stage application of PCT/CN2021/115188. This application claims priorities from PCT Application No. PCT/CN2021/115188, filed Aug. 29, 2021, and from the Chinese patent application 202110030703.9 filed Jan. 11, 2021, the content of which are incorporated herein in the entirety by reference.

TECHNICAL FIELD

The present disclosure relates to processing systems and methods for a multi-source signal and in particular to a system and a method for performing signal synchronization for a plurality of signals of a plurality of signal sources with different collection clock frequencies.

BACKGROUND

Along with the increasingly fast tempo of social lives of people's social lives, people's health problems draw more and more attention, and chronic diseases such as cardiovascular and cerebrovascular diseases as well as hypertension are threats to human health. Further, such diseases caused by abnormal blood pressure plague young people more and more. Therefore, an easy-to-use health monitoring device is urgently needed in society. In particular, a portable or household-suitable blood pressure monitoring system has increasingly become a necessity for daily health monitoring of people. During a monitoring process, people may monitor plural physiological indexes and thus can collect various physiological signals by using different devices. Complex systems usually use various sensors to collect signals from different aspects. For plural semaphores in time correspondence, such as sub-system independent clocks, since the clock sources are limited by accuracy and drift generated by environmental factors and the like, an accumulated error may exceed a given degree, resulting in the unavailability of data for the system.

Traditionally, the same clock is used as a clock source to provide a sampling reference for various sub-systems. The sampling clock goes through frequency division and frequency multiplication again based on the sampling reference. The data of the terminals maintains the same sampling rate or a multiple sampling rate. As the system becomes more and more complex, the sampling terminals may be far from a master machine, and the limitations of cable core number and signal attenuation and the like become more and more obvious. It is usually required to transmit the reference by other approaches. However, these approaches are all based on the transmission of a sampling clock or the use of a timestamp. The simple timestamp manner has limited accuracy while the high-accuracy timing system is complex and costly, for example, a satellite timing method. In the sampling clock transmission manner, the sub-system sampling clock completely comes from the master machine, and the sub-system sampling is triggered to rely on the master machine. Due to the influence of signal attenuation and the like, the error tolerance performance is low. Further, the sampling cycle of the terminals is limited by the sampling clock reception (especially the wireless system), and it is very difficult to carry out low power consumption designing.

In the process of obtaining blood pressure by using electro-cardio signals and blood oxygen pulse wave signals, if the lengths of the collected signals are not aligned, the collected signals are not aligned in the time axis, and asynchronization of the electro-cardio signals and blood oxygen pulse wave signals can lead to a large error in PPT result. Therefore, an inaccurate blood pressure result is obtained. It is urgent to achieve data synchronization and alignment processing in a scenario of multiple terminals and independent collection clocks with accurate time alignment and low power consumption.

SUMMARY

In order to resolve the above technical problems in the prior arts, the present disclosure provides a multi-source signal synchronization system, applied to a plurality of signal sources with different collection clock frequencies. The system includes: a timing beacon sending unit, deployed in a master machine signal source to generate RTC timing beacons at a fixed time interval T and a frequency F, and send the RTC timing beacons as synchronization marks to slave machine signal sources through a predetermined communication channel; a timing beacon receiving unit, deployed in each slave machine signal source to be enabled at a moment (T-t1) after receiving a previous RTC timing beacon so as to be in a state for waiting to receive a next RTC timing beacon from the timing beacon sending unit, and disabled after receiving the next RTC timing beacon; a multi-signal collecting unit, deployed on one of the multiple signal sources to collect a plurality of collected signals containing the synchronization marks from each signal source; and, a signal synchronization processing unit, configured to align signal headers based on a same synchronization mark of the multiple signals, and select a length of one of the collected multiple signals as a reference length to perform interpolation on other signals such that the multiple signals have a same length under the same synchronization mark.

According to the multi-source signal synchronization system of the present disclosure, the interpolation processing includes one of linear interpolation, Lagrange interpolation, rational function interpolation, cubic spline interpolation, ordered list search, interpolation polynomial, bivariate Lagrange interpolation, and bicubic spline interpolation.

According to the multi-source signal synchronization system of the present disclosure, the timing beacon receiving unit is disabled when the timing beacon receiving unit fails to receive the RTC timing beacons after being enabled for a time t2.

According to the multi-source signal synchronization system of the present disclosure, the timing beacon sending unit sends the RTC timing beacons in a wired or wireless manner.

According to the multi-source signal synchronization system of the present disclosure, the multi-signal collecting unit obtains the collected signals from the multiple signal sources through Bluetooth communication.

According to the multi-source signal synchronization system of the present disclosure, each signal source encodes the received synchronization marks within the fixed time interval T into a same number of sampling signals collected with a same sampling frequency.

According to the multi-source signal synchronization system of the present disclosure, a cycle updating unit is further included, which is deployed in the master machine signal source to, after performing a preset number of stretches or squeezes, shorten to ½T or ¼T the time interval T in which the timing beacon sending unit sends the RTC timing beacons.

According to another aspect of the present disclosure, there is provided a multi-source signal synchronization method applied to a plurality of signal sources with different collection clock frequencies. The method includes: by a timing beacon sending unit deployed in a master machine signal source, generating, at a fixed time interval T and a frequency F, RTC timing beacons, and sending the RTC timing beacons as synchronization marks to slave machine signal sources through a predetermined communication channel; enabling a timing beacon receiving unit deployed in each slave machine signal source at a moment (T-t1) after receiving a previous RTC timing beacon so as to be in a state for waiting to receive a next RTC timing beacon from the timing beacon sending unit, and disabling the timing beacon receiving unit after receiving the next RTC timing beacon; by a multi-signal collecting unit deployed on one of the multiple signal sources, collecting a plurality of collected signals containing the synchronization marks from each signal source; and, by a signal synchronization processing unit, aligning signal headers based on a same synchronization mark of the multiple signals, and selecting a length of one of the collected multiple signals as a reference length to perform interpolation on other signals such that the multiple signals have a same length under the same synchronization mark.

According to the multi-source signal synchronization method of the present disclosure, the interpolation processing includes one of linear interpolation, Lagrange interpolation, rational function interpolation, cubic spline interpolation, ordered list search, interpolation polynomial, bivariate Lagrange interpolation, and bicubic spline interpolation.

According to the multi-source signal synchronization method of the present disclosure, the timing beacon receiving unit is disabled when the timing beacon receiving unit fails to receive the RTC timing beacons after being enabled for a time t2.

According to the multi-source signal synchronization method of the present disclosure, each signal source encodes the received synchronization marks within the fixed time interval T into a same number of sampling signals collected with a same sampling frequency to identify the synchronization marks to which the sampling signals belong.

According to the multi-source signal synchronization method of the present disclosure, after a preset number of stretches or squeezes are performed, the time interval T in which the timing beacon sending unit sends the RTC timing beacons is shortened to ½T or ¼T.

The multi-source signal synchronization system and method of the present disclosure can not only align signal headers based on synchronization marks but also perform, by interpolation, length alignment on a plurality of signals having different sampling frequencies and belonging to a same synchronization mark, thereby providing good signal input for subsequent signal processing.

BRIEF DESCRIPTIONS OF THE DRAWINGS

The accompanying drawings herein incorporated into the specification and forming a part of the specification illustrate the embodiments of the present disclosure and serve to explain the principle of the present disclosure together with the specification.

DETAILED DESCRIPTIONS OF EMBODIMENTS

Figure 1:
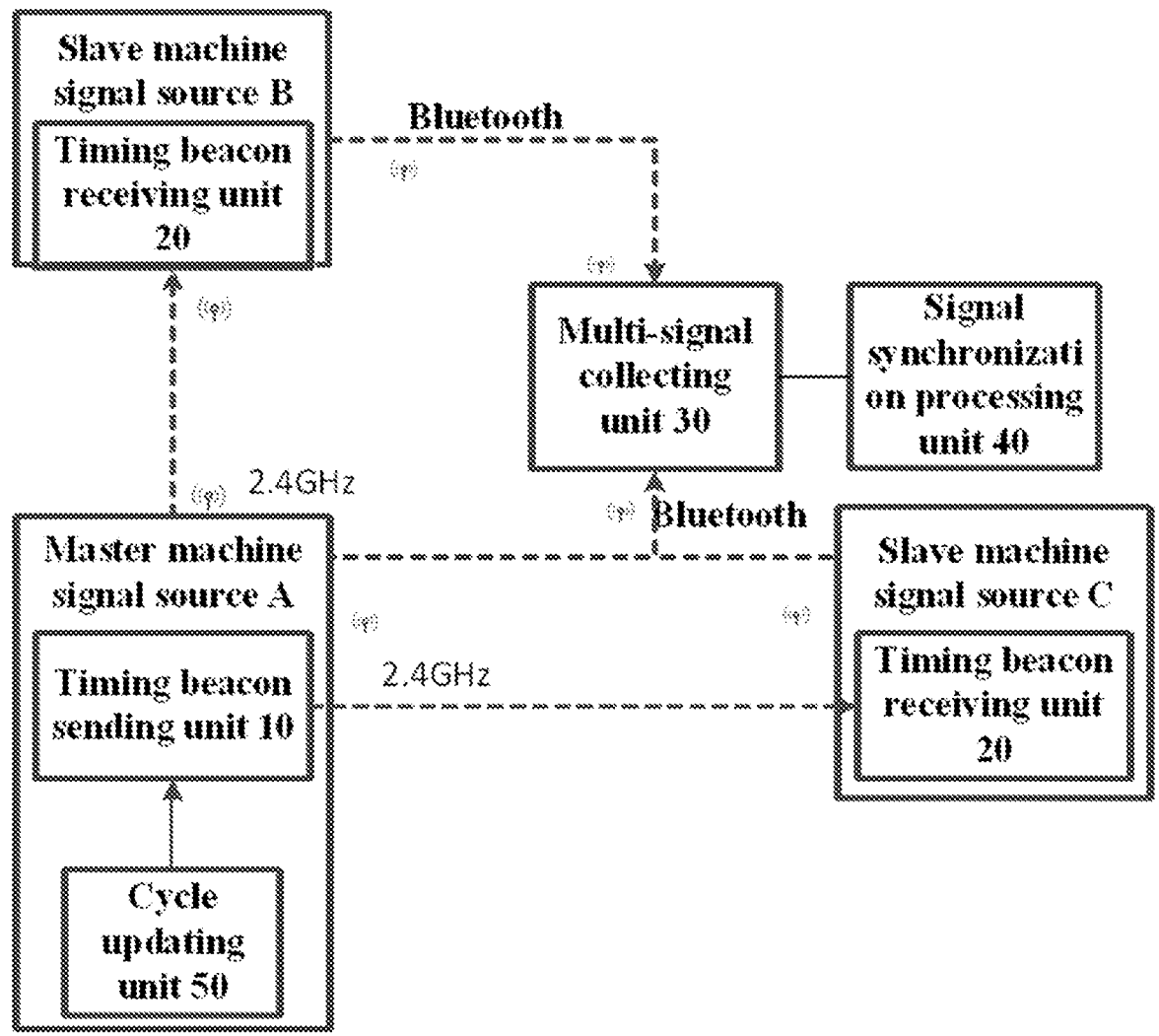
FIG. 1 is a block diagram illustrating a multi-source signal synchronization system according to an embodiment of the present disclosure.

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/of" as used herein refers to and includes any or all possible combinations of one or more of the associated listed items.

It is to be understood that, although the terms "first," "second," "third," and the like may be used in the present disclosure to describe various information, for example, a first collection signal and a second collection signal, such information should not be limited to these terms. The first collection signal may be referred to as the second collection signal and vice versa. These terms are used only to distinguish a same type of information from each other. Depending on the context, the term "if" as used herein may be interpreted as "when" or "upon" or "in response to determining".

In order to enable those skilled in the art to better understand the present disclosure, the present disclosure will be further set out below in combination with drawings and specific embodiments.

FIG. 1 is a block diagram illustrating a multi-source signal synchronization system according to an embodiment of the present disclosure. As shown in FIG. 1, the multi-source signal synchronization system of the present disclosure is deployed among a plurality of signal collection devices. The plurality of signal collection devices constitutes a plurality of signal sources, for example, a master machine signal source A, a slave machine signal source B, and a slave machine signal source C. Although FIG. 1 shows two slave machine signal sources B and C, there may be more signal sources in practical applications to collect signals to be synchronized. The master machine signal source A includes a Bluetooth BLE communication function to communicate with the slave machine signal sources so as to receive signal data collected by the slave machine signal sources while transmitting wireless synchronization configuration parameters to the slave machine signal sources. The master machine signal source A further includes a 2.4 GHz wireless transmitter (or transceiver) as a wireless synchronization source, which is independent of the Bluetooth BLE. The master machine signal source A may also perform parameter configuration, and signal reception and transmission with the slave machine signal sources B and C in a wired manner.

The slave machine signal source also includes a Bluetooth BLE communication function to communicate with the master machine signal source so as to transmit the collected signal data to the master machine signal source while receiving wireless synchronization configuration parameters from the master machine signal source. The slave machine signal source further includes a 2.4 GHz wireless receiver (or transceiver) independent of the Bluetooth BLE to receive wireless synchronization signals. Both Bluetooth BLE and the 2.4 GHz wireless receiver can be implemented by using prior arts and thus no redundant descriptions will be made herein. As mentioned above, in the present disclosure, Bluetooth BLE is used to perform data transmission, or another wireless communication manner or a wired communication manner may be used to transmit the collected signals. The synchronization marks can be sent through a public frequency band 2.4 GHz or through another frequency band such as 433 MHz or wired direct connection based on actual situations. The transmission time of the synchronization source (delay) needs to be far less than the data synchronization error requirement (at least one or two orders of magnitude to ensure accuracy). Compared with the data synchronization error, the tiny delay of the synchronization source can be directly neglected. Invariable delay errors to some degree may be deducted when the master machine processes data. Considering power consumption, synchronization can be performed in an intermittent working manner.

The master machine signal source A sends through Bluetooth BLE to the slave machine signal sources B and C: Real Time Clock (RTC) timing beacon (accurate to seconds) or synchronization marks, and performs parameter configuration through 2.4 GHz wireless and configures synchronization logic configuration parameters through 2.4 GHz wireless. The 2.4 GHz wireless configuration parameters include a 2.4 GHz frequency band and a channel address to specify the master and slave machines 2.4 GHz in a wireless channel and switch the wireless channel when signal interference occurs. The 2.4 GHz synchronization logic configuration parameters include a 2.4 GHz intermittent synchronization cycle (T), a time (t1) at which the 2.4 GHz timing information receiving unit 20 is opened in advance prior to the 2.4 GHz synchronization trigger, and a time (t2) expired for synchronous reception of the 2.4 GHz timing information receiving unit 20. In this way, the RTC information is sent for first-level timing through Bluetooth BLE, such that the clock difference between the master and slave machines will not be excessively large due to accumulation over a long time, and otherwise, the timing for the slave machine to turn on the transceiver is completely staggered with the timing of the master machine, leading to permanent failure of synchronization. After the first-level timing, during the period in which the transceiver of the slave machine is turned on, the master machine sends, through the 2.4 GH module, a synchronization mark to mark with higher accuracy. When the receiving module receives information, the software implementation is to mark in data packet directly through a terminal, with accuracy to ms or even smaller unit. For a general processor chip, the RTC module has an accuracy of 1 second and the accuracy of ms or even smaller unit cannot be achieved. Thus, the RTC is sent through the Bluetooth BLE to mark with higher accuracy, such that multiple signals can be synchronized with higher accuracy. Considering the real-timeliness of the information processing, the current 2.4 GHz module only sends one synchronization mark. Optionally, the synchronization mark sent by the 2.4 GHz module may also include RTC time information and higher accuracy time information.

The timing information sending unit 10 of the master machine signal source A firstly performs RTC timing for the slave machine signal sources B and C, with the accuracy controlled to within is due to transmission time or the like. The master machine signal source A, and the slave machine signal sources B and C start timing from reception of the RTC. Before the configured intermittent synchronization time (T) is reached, the 2.4 GHz timing information receiving units 20 of the slave machine signal sources B and C are enabled t1 earlier to wait for signals. Enabling the timing information receiving unit 20 earlier is to prevent failure to receive a synchronization mark signal in time due to a large clock difference between the master machine signal source A and the slave machine signal sources B and C. The master machine signal source A reaches the agreed time (T) and starts the 2.4 GHz transmitter to transmit the synchronization mark signal, and the slave machine signal sources B and C, after their timing information receiving units 20 receive the synchronization signal, make a mark at the corresponding position of the collected data. If the 2.4 GHz timing information receiving units 20 of the slave machine signal sources B and C does not receive the synchronization mark signal for more than the expiration time t2, the 2.4 GHz timing information receiving units 20 will be automatically disabled.

Figure 2:
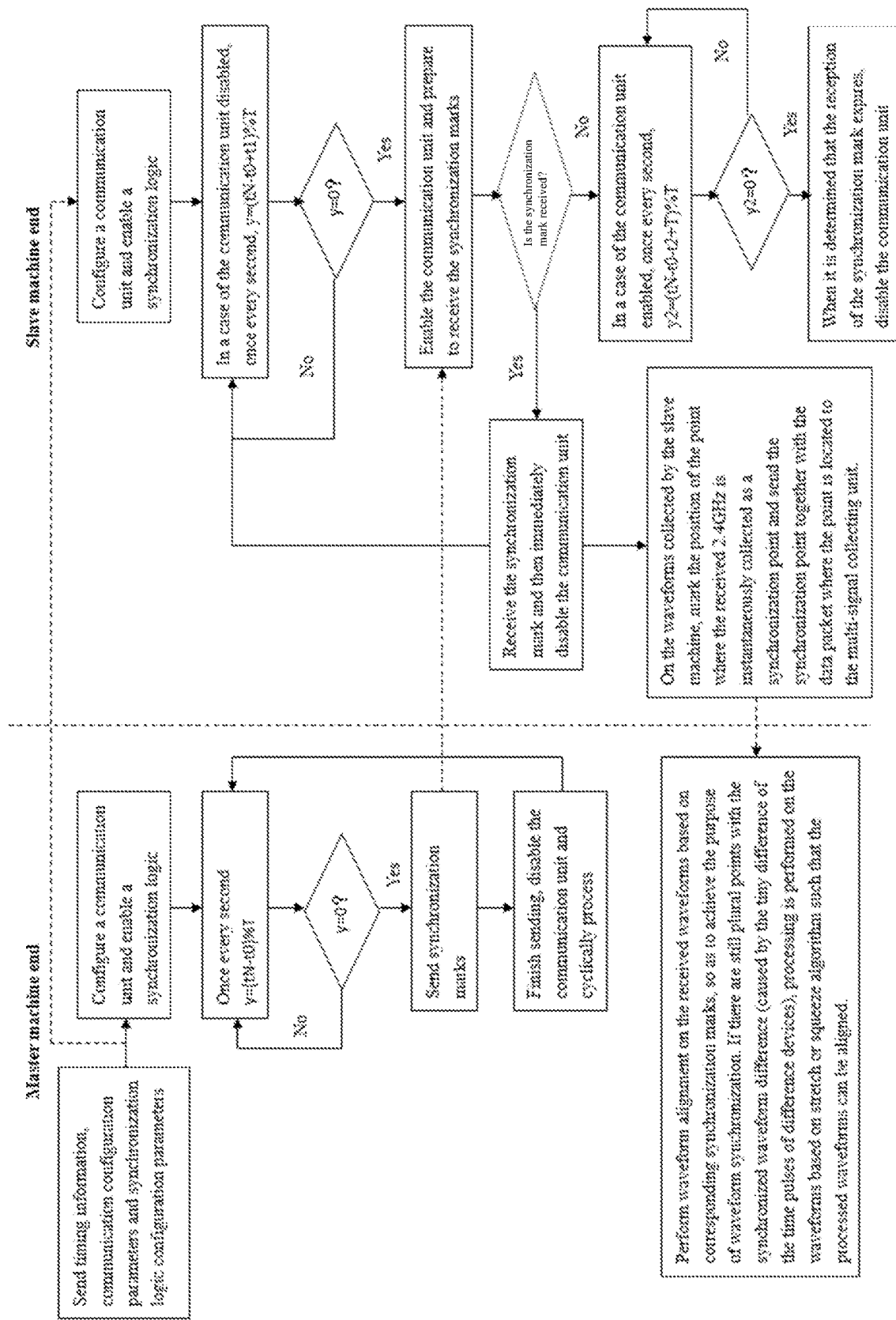
FIG. 2 is a flowchart illustrating a running process of a multi-source signal synchronization system according to an embodiment of the present disclosure.

FIG. 2 is a flowchart illustrating a running process of a multi-source signal synchronization system according to an embodiment of the present disclosure. As shown in FIG. 2, at the left is the master machine signal source A, i.e. the master machine end, and at the right is the slave machine signal source B or C, i.e. the slave machine end. As mentioned above, the master machine end, through wireless communication (for example, 2.4 GHz wireless channel) or wired channel, sends communication configuration parameters and synchronization logic configuration parameters to signal collection units (not shown) of the master machine end and the slave machine ends, for example, sends a frequency band, a channel address and a synchronization cycle T and the like. The MAC address and the frequency band usually are a MAC address and a frequency band of a 2.4G synchronization device. The communication units of the master machine end and the slave machine end may be a wireless communication unit or a wired communication unit, which can be determined based on actual situations. Specifically, the communication units may be the timing information receiving unit 20 and the timing information sending unit 10. Although the timing information receiving unit 20 is named as a receiving unit, it can also send information. Similarly, although the timing information sending unit 10 is named as a sending unit, it can also receive information.

After the communication MAC address and frequency band are verified or unified among all component units of the system, the timing information sending unit 10 sends a synchronization frame (synchronization signal) at a time interval of T seconds to a plurality of slave machine signal sources at the same time. Specifically, the master machine end and the slave machine end both can perform timing based on their own independent persistent pulses, and based on a rule, determine whether to send timing information or determine whether to enable to receive timing information. As shown in FIG. 2, the master machine end can determine whether one timing beacon sending cycle T elapses once every second.

Specifically, the timer (not shown) calculates the remainder y once every second based on the formula: y=(tN−t0)% T, where tN refers to a current timestamp of the master machine signal source, which is a unique current timestamp of the master machine signal source, and t0 refers to a zero timestamp after the master machine signal source is enabled. In this case, (tN−t0) refers to the total time elapsing after the master machine is enabled, which is calculated once every other second. When the remainder y is 0, it indicates that the time which is integer times the timing sending cycle T elapses. Therefore, an instruction is sent to the timing information sending unit 10 to instruct the timing information sending unit 10 to send in time the timing information, i.e. synchronization information. Furthermore, the timer (not shown) of the slave machine end calculates the remainder y once every second based on the formula: y=(tN−t0+t1)% T, where tN refers to a current timestamp of the slave machine signal source, which is a unique current timestamp of the slave machine signal source, and t0 refers to a zero timestamp after the slave machine signal source is enabled. In this case, (tN−t0) refers to the total time elapsing after the slave machine is enabled, and (tN−t0+t1) refers to the time after t1 is advanced by the slave machine over the actual elapsed time, which is calculated once every other second. When the remainder y is 0, it indicates that the time which is integer times the timing receiving cycle T elapses. Therefore, an enable instruction is sent to the timing information receiving unit 20 to instruct the timing information receiving unit 20 to be enabled in time, waiting for receiving the timing information, i.e. the synchronization information. Further, the timing information receiving unit 20 is disabled immediately after receiving the timing information and waits for another enable signal from the timer. Furthermore, the timer also monitors an enable time. If no timing information is received after it is enabled for a predetermined time t2, the timing information receiving unit 20 is directly instructed to be disabled. Specifically, in the case of the communication unit enabled, the timer calculates the remainder y2 once every second based on the formula: y2=(tN−t0−t2+T) % T. If the remainder is 0, it indicates that the timing information receiving unit 20 is enabled and does not receive the timing information for a time of t2.

Although one calculation per second is mentioned in the above timing process, the calculation interval may be adjusted based on actual situations, for example, adjusted to 0.5 seconds, 1.5 seconds, or 2 seconds. This adjustment is mainly performed based on the transmission interval cycle T of the synchronization mark.

While the slave machine signal source receives the synchronization mark, a position of a point at which the received synchronization mark is collected instantaneously is marked as a synchronization point on the collection waveform of the slave machine, and then sent, together with a data packet where the point is located, to the multi-signal collecting unit 30. Since the sampling accuracies of the signal sources are independent of each other, it is possible that different numbers of signals can be collected in one objective time interval. For example, there are a master machine A, a slave machine B, and a slave machine C, and the master machine A is consistent in clock accuracy with the slave machine B. The master machine A has a sampling rate of 250 Hz, which means 250 data points can be collected in one second. The clock accuracy of the slave machine B has an error of −0.4% as compared with the master machine A, namely, 249 data points can be collected in one second. If the respective clock marks of the master and slave machines are used without performing synchronization processing, the following problems may occur to the received data of the master machine: 1. due to accumulated error, the start points of the data packets of the slave machines B and C are not consistent, and the difference will be larger if the running time is longer; 2. the lengths of data received by the master machine from the slave machines in unit time are not consistent. For the above situations, with reference to FIG. 1, the signal synchronization processing unit 40 performs synchronization processing on the received signals of the multiple signal sources.

Firstly, the signal synchronization processing unit 40 extracts synchronization marks from the data collected by the multi-signal collecting unit 30 from the slave machines B and C and then, with the synchronization marks as start points, performs header alignment on the B and C data. Specifically, waveform alignment is performed on the received waveforms based on the corresponding synchronization marks, so as to achieve the purpose of waveform synchronization.

Subsequently, the signal synchronization processing unit 40 performs stretch or squeeze on the signals with different sampling data amounts. Specifically, for a case in which there are still plural points with the synchronized waveform difference (caused by the tiny error of the time pulses of different devices), the waveforms are processed based on the stretch or squeeze algorithm such that the processed waveforms can be aligned. For example, linear interpolation processing is performed on the signals of the slave machine C which collects 249 data points rather than 250 data points, such that it is stretched to 250 data points, which is specifically described below:

The slave machine B' data is expressed as an array:

$$B[250]=\{B0,B1,B2 \ldots B249\};$$

The slave machine C data is expressed as an array:

$$C[249]=\{C0,C1,C2 \ldots C248\};$$

C'[250] is defined, where C' is obtained by performing linear interpolation on C[249]:

$$C'0=C0$$

$$C'1=C0\times 1/249+C1\times 248/249$$

$$C'2=C1\times 2/249+C2\times 247/249$$

$$C'3=C2\times 3/249+C3\times 246/249$$

$$\ldots$$

$$C'247=C246\times 247/249+C247\times 2/249$$

$$C'248=C247\times 248/249+C248\times 1/249$$

$$C'249=C248$$

The signal synchronization processing unit 40 obtains, by interpolation calculation, the data C' with the same length as the slave machine B, and conveys B[250] and C'[250] into subsequent calculations for desired processing.

Likewise, for example, if there are more data points with the sampling rate of the slave machine C, for example, 251 data points, it is required to perform squeeze processing as follows:

The data of the slave machine C is expressed as an array:

$$C[249]=\{C0,C1,C2 \ldots C250\};$$

C'[250] is defined, where C' is obtained by squeezing C[251].

$$C'0=C0$$

$$C'1=C1\times 250/251+C2\times 1/251$$

$$C'2=C2\times 249/251+C3\times 2/251$$

$$C'3=C3\times 248/251+C4\times 3/251$$

. . .

$$C'247=C247\times 2/251+C248\times 249/251$$

$$C'248=C248\times 1/251+C249\times 250/251$$

$$C'249=C250$$

The signal synchronization processing unit 40 obtains, by squeeze calculation, the data C' with the same length as the slave machine B, and conveys B[250] and C'[250] into subsequent calculations for desired processing.

It is noted that the interpolation can, based on actual signal characteristics, use various mathematic interpolation methods. Herein, descriptions are made with the simplest linear interpolation as an example. Similarly, the squeeze may use other squeeze methods. In the present disclosure, the influence resulting from the clock error of the components of the system can be corrected and also, the problem of inconsistency of the sampling rates used by different slave machines can be solved.

It is to be pointed out that the chip 24L01 is used for the units which involve signal collection and transmission. nRF24L01 is an ISM frequency band single-chip radio transceiver chip produced by NORDIC to work between 2.4 GHz and 2.5 GHz. The radio transceiver includes: a frequency generator, an enhanced "ShockBurst" mode controller, a power amplifier, a crystal oscillator, a modulator, and a demodulator. Its output power channel and protocol can be set through an SPI interface. It can be connected to various single-chip microcomputer chips and complete wireless data transmission. Although descriptions are made herein with the 24L01 chip as an example, other chips with the same function can also be employed and will not be enumerated one by one.

The synchronization mark generated and sent by the timing information sending unit 10 is sometimes called beat signal, timestamp, time header, second synchronization header, or synchronization mark. One signal sent by the timing information sending unit 10 through 2.4 GHz radio frequency can also be sent by another wireless channel, as long as the purpose of the present disclosure can be satisfied. The synchronization mark is sent for one second at an interval cycle T, and the data has only one byte. The synchronization mark may be one synchronization frame with fixed data or a synchronization frame containing a number, or an absolute time run by the timing information sending unit 10, which contains a current time with accuracy to milliseconds, for example, Dec. 26, 2016, 22 hours, 35 minutes, 10 seconds and 50 milliseconds. Optionally, the synchronization frame may also contain a frame number and a current absolute time at the same time. When the synchronization frame is sent and received in the system, there usually is a very small transmission delay, which may be negligible for the technical solution of the present disclosure. However, it should be pointed out that the delay can be calculated during the loading of the synchronization frame, so as to accurately load the synchronization frame, namely, the transmission delay is deducted from the slave machine signal source. Because the calculation of the data transmission delay belongs to the prior arts, descriptions thereof will not be made herein.

After the master machine signal source or the slave machine signal source obtains a synchronization mark, the position of the point at which the received synchronization mark is instantaneously collected is marked as a synchronization point during signal collection, and thus, the synchronization signal is encoded or loaded into the collected signal or data packet.

The fields of each data packet include the followings:

synchronization mark 1, packet number 1, 10 sampling points synchronization mark 1, packet number 2, 10 sampling points synchronization mark 1, packet number 3, 10 sampling points

. . .

synchronization mark 1, packet number 25, 10 sampling points synchronization mark 2, packet number 1, 10 sampling points synchronization mark 2, packet number 2, 10 sampling points synchronization mark 2, packet number 3, 10 sampling points

. . .

synchronization mark 2, packet number 25, 10 sampling points synchronization mark 3, packet number 1, 10 sampling points synchronization mark 3, packet number 2, 10 sampling points synchronization mark 3, packet number 3, 10 sampling points

. . .

synchronization mark 3, packet number 25, 10 sampling points synchronization mark 4, packet number 1, 10 sampling points synchronization mark 4, packet number 2, 10 sampling points synchronization mark 4, packet number 3, 10 sampling points

. . .

synchronization mark 4, packet number 25, 10 sampling points

Due to different clock accuracies of the devices, it is possible that there may be a case of insufficient or excessive sampling points in a range of one synchronization mark. The numbers of the synchronization marks can be cyclically repeated in a cycle. As described above, after the slave machine signal source receives synchronization marks, the synchronization marks are loaded into the collected signals or data packets within one synchronization cycle T. Since the slave machine data packets are mixed with the synchronization marks, the slave machine signal source may send signals to the multi-signal collecting unit 30 without sequence, and the signal synchronization processing unit can also perform sorting and alignment on the data packets of different signal sources based on the synchronization marks.

Optionally, with reference to FIG. 1, the master machine signal source A further includes a cycle updating unit 50. The master machine signal source A receives the slave machine data in a complete cycle and then performs data stretch or squeeze processing. The system response is long (at least one complete cycle is used to obtain the two values 250 and 249 of the slave machines B and C). Further, since the slave machine data of a complete cycle is received for re-processing, large storage space is occupied. As a result, continuously performing data processing of small batches helps to eliminate the need for large storage space and shorten the system response time. Therefore, the system of the present disclosure further provides a cycle updating unit 50. After the system works for a period of time based on an initial synchronization cycle T1, the system obtains the error of different slave machine signal sources based on the data collected by the slave machine signal source B or C, for example, the slave machine signal source C only obtains 249 data points instead of 250 data points. Thus, the error is unchanged within a predetermined time. Thus, the cycle updating unit 50 can shorten the synchronization cycle T1 to a synchronization cycle T2, but the signal synchronization processing unit 40 still uses the known sampling error result of the slave machine signal source C to perform signal data stretch and squeeze on the sampling data received within the synchronization cycle T2. Usually, T2 is half of T1. Optionally, T1 is T2 times 2 to the power of the integer. Hence, by using the previously-obtained error value, the data of the slave machine signal source C is processed in queues based on the principle of first in and first done. Specifically, if T1=2T2, the same synchronization mark can be sent two times in the entire cycle T1 without needing to wait for all data of one complete cycle T1. In a general system, the error of the system clock under the fixed environment condition is basically unchanged (unless a sharp temperature change causes clock drift; if a high stability clock, for example, a temperature-compensated crystal oscillator is used, there is no problem of drift). In this way, partial data within one complete cycle T1 is obtained and the data storage space of the multi-signal collecting unit 30 or the signal synchronization processing unit 40 can be reduced by T2/T1, and further, the time required for calculation is reduced to T2/T1, and the cache occupation is reduced by T2/T1. In the case that the environment changes or the system finds the clock drift of the slave machine, the master machine can configure an intermittent synchronization cycle T at any time or regularly to correct the error.

The basic principle of the present disclosure has been described with specific embodiments. However, it should be noted that those skilled in the art can understand that any or all steps or components of the method or apparatus of the present disclosure can be implemented in the form of hardware, firmware, software, or a combination thereof in any computing apparatus (e.g. processor or storage medium or the like) or a network of the computing apparatus. This implementation can be achieved by persons of ordinary skills in the art reading the present disclosure and employing their basic programming skills.

As a result, the object of the present disclosure can also be implemented by running one program or one set of programs in any computing apparatus. The computing apparatus may be a well-known general apparatus. Thus, the object of the present disclosure can also be implemented by only providing a program product containing program codes for implementing the method or apparatus. In other words, the program product and the storage medium storing the program product can constitute the present disclosure respectively. Obviously, the storage medium may be any well-known storage medium or any storage medium developed in the future.

It is further to be noted that, in the apparatus and method of the present disclosure, it is apparent that the components or the steps can be decomposed and/or recombined. These decompositions and/or recombinations shall be regarded as equivalent solutions of the present disclosure. Further, the steps for performing the above series of processing can be naturally performed in an indicated sequence, for example, in a time sequence, but it does not mean these steps must be performed in the time sequence. These steps can be performed in parallel or independent of each other.

The above implementations do not constitute any limitation to the scope of protection of the present disclosure. Those skilled in the art should understand that, depending on the design requirements and other factors, various changes, combinations, sub-combinations or substitutions may occur. Any changes, equivalent substitutions and improvements and the like made within the spirit and principle of the present disclosure shall fall within the scope of protection of the present disclosure.

What is claimed is:

1. A multi-source signal synchronization system, applied to a plurality of signal sources with different collection clock frequencies, and comprising:
   a timing beacon sending unit, deployed in a master machine signal source to generate RTC timing beacons at a fixed time interval T, and send the RTC timing beacons as synchronization marks to slave machine signal sources through a predetermined communication channel;
   a timing beacon receiving unit, deployed in each slave machine signal source to be enabled at a moment (T-t1) after receiving a previous RTC timing beacon so as to be in a state for waiting to receive a next RTC timing beacon from the timing beacon sending unit, and disabled after receiving the next RTC timing beacon;
   a multi-signal collecting unit, deployed on one of the multiple signal sources to collect a plurality of collected signals containing the synchronization marks from each signal source; and,
   a signal synchronization processing unit, configured to align signal headers based on a same synchronization mark of the multiple signals, and select a length of one of the collected multiple signals as a reference length to perform stretch or squeeze on other signals such that the multiple signals have a same length under the same synchronization mark.

2. The multi-source signal synchronization system of claim 1, wherein the timing beacon receiving unit is disabled when the timing beacon receiving unit fails to receive the RTC timing beacons after being enabled for a time t2.

3. The multi-source signal synchronization system of claim 1, wherein the timing beacon sending unit sends the RTC timing beacons in a wired or wireless manner.

4. The multi-source signal synchronization system of claim 1, wherein the multi-signal collecting unit obtains the collected signals from the multiple signal sources through Bluetooth communication.

5. The multi-source signal synchronization system of claim 1, wherein each signal source encodes the received synchronization marks within the fixed time interval T into a same number of sampling signals collected with a same sampling frequency.

6. The multi-source signal synchronization system of claim 1, further comprising a cycle updating unit, deployed in the master machine signal source to, after performing a preset number of stretches or squeezes, shorten to ½T or ¼T the time interval T in which the timing beacon sending unit sends the RTC timing beacons.

7. The multi-source signal synchronization system of claim 1, wherein the predetermined communication channel is a Bluetooth communication channel and/or a 2.4 GHz wireless communication channel.

8. A multi-source signal synchronization method, applied to a plurality of signal sources with different collection clock frequencies, and comprising:
  by a timing beacon sending unit deployed in a master machine signal source, generating, at a fixed time interval T, RTC timing beacons, and sending the RTC timing beacons as synchronization marks to slave machine signal sources through a predetermined communication channel;
  enabling a timing beacon receiving unit deployed in each slave machine signal source at a moment (T-t1) after receiving a previous RTC timing beacon so as to be in a state for waiting to receive a next RTC timing beacon from the timing beacon sending unit, and disabling the timing beacon receiving unit after receiving the next RTC timing beacon;
  by a multi-signal collecting unit deployed on one of the multiple signal sources, collecting a plurality of collected signals containing the synchronization marks from each signal source; and,
  by a signal synchronization processing unit, aligning signal headers based on a same synchronization mark of the multiple signals, and selecting a length of one of the collected multiple signals as a reference length to perform stretch or squeeze on other signals such that the multiple signals have a same length under the same synchronization mark.

9. The multi-source signal synchronization method of claim 8, further comprising: disabling the timing beacon receiving unit when the timing beacon receiving unit fails to receive the RTC timing beacons after being enabled for a time t2.

10. The multi-source signal synchronization method of claim 8, further comprising: by each signal source, encoding the received synchronization marks within the fixed time interval T into a same number of sampling signals collected with a same sampling frequency to identify the synchronization marks to which the sampling signals belong.

11. The multi-source signal synchronization method of claim 8, further comprising: after performing a preset number of stretches or squeezes, shortening to ½T or ¼T the time interval T in which the timing beacon sending unit sends the RTC timing beacons.

\* \* \* \* \*